US008624773B2

(12) United States Patent
Nguyen et al.

(10) Patent No.: US 8,624,773 B2
(45) Date of Patent: Jan. 7, 2014

(54) MULTIDIRECTIONAL TARGET DETECTING SYSTEM AND METHOD

(75) Inventors: Lam Huy Nguyen, Laurel, MD (US); Jeffrey Sichina, Ocean View, DE (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 443 days.

(21) Appl. No.: 12/942,362

(22) Filed: Nov. 9, 2010

(65) Prior Publication Data

US 2012/0112957 A1    May 10, 2012

(51) Int. Cl.
*G01S 13/00*    (2006.01)

(52) U.S. Cl.
USPC ............ 342/25 A; 342/25 R; 342/70; 342/179

(58) Field of Classification Search
USPC ....... 342/25 R, 25 A, 25 B, 25 C, 25 D, 25 E, 342/25 F, 70–72, 179
See application file for complete search history.

(56) References Cited

U.S. PATENT DOCUMENTS

| 4,757,450 | A | * | 7/1988 | Etoh | 701/96 |
| 4,965,582 | A | * | 10/1990 | Hellsten | 342/25 A |
| 5,185,608 | A | * | 2/1993 | Pozgay | 342/17 |
| 5,204,682 | A | * | 4/1993 | Beasley | 342/117 |
| 5,260,708 | A | * | 11/1993 | Auterman | 342/25 C |
| 5,673,050 | A | * | 9/1997 | Moussally et al. | 342/22 |
| 5,805,098 | A | * | 9/1998 | McCorkle | 342/25 F |
| 5,826,819 | A | * | 10/1998 | Oxford | 244/3.14 |

(Continued)

OTHER PUBLICATIONS

Marc Ressler, Lam Nguyen, Francois Koenig, David Wong, and Gregory Smith, "The Army Research Laboratory (ARL) Synchronous Impulse Reconstruction (SIRE) Forward-Looking Radar," Proceedings of SPIE, Unmanned Systems Technology IX, vol. 6561, May 2007.

(Continued)

*Primary Examiner* — Jack W Keith
*Assistant Examiner* — Peter Bythrow
(74) *Attorney, Agent, or Firm* — Lawrence E. Anderson

(57) ABSTRACT

A method and system for investigating and displaying an image of an area of interest comprising a moving vehicle; at least one processor for producing an image of the area of interest; at least one first transmitter for emitting first signals substantially in a first direction, the at least one first transmitter being operatively associated with the moving vehicle and the processor; at least one first receiver for receiving backscattered signals resulting from the first radar signals, the at least one first receiver being operatively associated with the moving vehicle and the processor; at least one second transmitter operatively for emitting second signals in a direction substantially opposite to the first direction, the at least one second transmitter being operatively associated with the moving vehicle and the processor; at least one second receiver for receiving backscattered signals resulting from the second signals, the at least one second receiver being operatively associated with the moving vehicle and the processor, a GPS subsystem for providing position data relating to the position of the vehicle; the at least one first receiver and the at least one second receiver operating to provide image data to the at least one processor; the at least one processor operating to combine image data from the at least one first receiver and the at least one second receiver with the position data to form a single image; and a display to display the combined image data.

20 Claims, 13 Drawing Sheets
(3 of 13 Drawing Sheet(s) Filed in Color)

(56) References Cited

U.S. PATENT DOCUMENTS

| | | | |
|---|---|---|---|
| 5,926,125 A * | 7/1999 | Wood | 342/25 F |
| 5,973,634 A * | 10/1999 | Kare | 342/25 A |
| 6,054,947 A * | 4/2000 | Kosowsky | 342/191 |
| 6,067,031 A * | 5/2000 | Janky et al. | 340/903 |
| 6,107,956 A * | 8/2000 | Russell et al. | 342/70 |
| 6,597,304 B2 * | 7/2003 | Fienup | 342/25 R |
| 6,879,279 B2 * | 4/2005 | Stappaerts | 342/25 R |
| 6,924,762 B2 * | 8/2005 | Miyake et al. | 342/70 |
| 7,154,434 B1 * | 12/2006 | Sego | 342/161 |
| 7,280,068 B2 * | 10/2007 | Lee et al. | 342/22 |
| 7,307,579 B2 * | 12/2007 | Rees et al. | 342/29 |
| 7,443,334 B2 * | 10/2008 | Rees et al. | 342/29 |
| 7,474,219 B2 * | 1/2009 | Richards et al. | 340/572.4 |
| 7,482,970 B2 * | 1/2009 | Buck | 342/25 A |
| 7,577,398 B2 * | 8/2009 | Judd et al. | 455/11.1 |
| 7,705,767 B2 * | 4/2010 | Fujimura | 342/25 A |
| 7,796,829 B2 * | 9/2010 | Nguyen et al. | 382/260 |
| 7,817,081 B2 * | 10/2010 | Inoue et al. | 342/70 |
| 8,193,967 B2 * | 6/2012 | Nguyen et al. | 342/25 F |
| 2002/0122000 A1 * | 9/2002 | Bradley et al. | 342/22 |
| 2003/0020648 A1 * | 1/2003 | Fienup | 342/25 |
| 2006/0166681 A1 * | 7/2006 | Lohbihler | 455/456.2 |
| 2006/0273946 A1 * | 12/2006 | Krikorian et al. | 342/25 A |
| 2007/0013575 A1 * | 1/2007 | Lee et al. | 342/52 |
| 2007/0152874 A1 * | 7/2007 | Woodington | 342/159 |
| 2007/0252748 A1 * | 11/2007 | Rees et al. | 342/29 |
| 2008/0055149 A1 * | 3/2008 | Rees et al. | 342/29 |
| 2008/0169962 A1 * | 7/2008 | Rees et al. | 342/29 |
| 2008/0204311 A1 * | 8/2008 | Fujimura | 342/25 B |
| 2009/0033548 A1 * | 2/2009 | Boxman et al. | 342/179 |
| 2009/0102705 A1 * | 4/2009 | Obermeyer | 342/25 F |
| 2009/0289838 A1 * | 11/2009 | Braun | 342/25 A |
| 2010/0066587 A1 * | 3/2010 | Yamauchi et al. | 342/70 |
| 2010/0207808 A1 * | 8/2010 | Prats et al. | 342/25 F |

OTHER PUBLICATIONS

Nguyen, L., "Signal and Image Processing Algorithms for the Army Research Lab Ultra-Wideband Synchronous Impulse Reconstruction (UWB SIRE) Radar," Army Research Laboratory Technical Report ARL-TR-4784, Army Research Laboratory Adelphi, MD 20783-1197, Apr. 2009.

Nguyen, L., "Image Resolution Computation for Ultra-Wideband (UWB) Synchronous Impulse Reconstruction (SIRE) Radar" Army Research Laboratory Technical Report ARL-TN-294, Army Research Laboratory Adelphi, MD 20783-1197, Sep. 2007.

Nguyen, L.; Wong, D.; Ressler, M.; Koenig, F.; Stanton, B.; Smith, G.; Sichina, J.; Kappra, K. "Obstacle Avoidance and Concealed Target Detection Using the Army Research Lab Ultra-Wideband Synchronous Impulse Reconstruction (UWB SIRE) Forward Imaging Radar," Proceedings of SPIE, Detection and Remediation Technologies for Mines and Minelike Targets XII, vol. 6553, Apr. 2007.

Nguyen, L.; Ressler, M.; Sichina, J. "Sensing Through the Wall Imaging Using the Army Research Lab Ultra-wideband Synchronous Impulse Reconstruction (UWB SIRE) Radar," Proceedings of SPIE, Radar Sensor Technology XII, vol. 6947, Apr. 2008.

Nguyen, L.; Soumekh, M. "System Trade Analysis for an Ultra-wideband Forward Imaging Radar," Proceedings of SPIE, Unmanned Systems Technology VIII, vol. 6230, 2006.

Nguyen, L. H.; Ton, T.; Wong, D.; Soumekh, M. "Adaptive Coherent Suppression of Multiple Wide-bandwidth RFI Sources in SAR," Proceedings of SPIE Int. Soc. Opt. Eng. vol. 5427, 1, 2004.

Nguyen, L.; Soumekh, M. "Suppression of Radio Frequency Interference (RFI) for Equivalent Time-sampling Ultra wideband Radar," Proceedings of SPIE, Algorithms for Synthetic Aperture Radar Imagery XII, 2005.

McCorkle, J.; Nguyen, L. "Focusing of Dispersive Targets Using Synthetic Aperture Radar," ARL-TR-305; U.S. Army Research Laboratory: Adelphi, MD, Aug. 1994.

Nguyen, L. "Signal Processing Technique to Remove Signature Distortion in ARL Synchronous Impulse Reconstruction (SIRE) Ultra-Wideband (UWB) Radar;" ARL-TR-4404; U.S. Army Research Laboratory: Adelphi, MD, Mar. 2008.

Nguyen, L., et al. "Signal Processing Techniques for Forward Imaging Using Ultrawideband Synthetic Aperture Radar," Proceedings of SPIE, vol. 5083, Unmanned Ground Vehicle Technology V, Sep. 2003, pp. 505-518.

M. Ressler et al., "The Army Research Laboratory Ultra-Wideband Testbed Radars," IEEE 1995 International Radar Conference, Alexandria, Va., May 1995.

John W. McCorkle, "Focusing of Synthetic Aperture Ultra Wideband Data," IEEE Int'l Conf on Systems Engineering, Aug. 1992, p. 1-5.

* cited by examiner

MULTIDIRECTIONAL TARGET DETECTING SYSTEM AND METHOD

STATEMENT OF GOVERNMENT INTEREST

The embodiments herein may be manufactured, used, and/or licensed by or for the United States Government without the payment of royalties thereon.

TECHNICAL FIELD

The embodiments herein generally relate to target detecting, and in particular, to multidirectional target detection and aerial surveillance.

BACKGROUND OF THE INVENTION

Synthetic Aperture Radar (SAR) systems have been utilized for many years for various applications and are well known for providing high resolution. For instance, SAR systems are well known as for identifying objects out of deliberate or natural clutter to provide a variety of functions including: area mapping, surveillance, and target detection. Further, these systems can be used from the ground (i.e., ground based SAR systems) as well as from the air (airborne SAR systems) and exploit the motion of an aircraft or vehicle, simulating a large antenna by combining return radar data along the flight path. This simulation is called the synthetic aperture.

Generally, airborne SAR systems are typically side-looking radars which produce two-dimensional (2-D) images of the earth's surface that are perpendicular to the aircraft path of flight and located on one side of the aircraft. One dimension in the image is called range (i.e., cross track) and is a measurement of the "line-of sight" distance from the radar to the target. Range measurements are determined by measuring the time from transmission of a pulse to receiving the echo from a target. Additionally, range resolution is determined by the transmitted pulse width. Cross-range resolution is achieved by coherently integrating the radar return signals along the flight path.

An example of a SAR system is disclosed in U.S. Pat. No. 7,796,829 (hereby incorporated by reference) entitled "Method and system for forming an image with enhanced contrast and/or reduced noise," listing as inventors the same coinventors as the present application and filed on Dec. 10, 2008, and being assigned to The United States of America as represented by the Secretary of the Army.

To study the capabilities and limitations of utilizing the ultra-wideband (UWB) radar technology for the detection of concealed targets, the Army Research Laboratory (ARL) implemented different versions of UWB low-frequency SAR. A version of the UWB SAR radar that ARL designed and built is the vehicle-based radar which is discussed in detail in the publication by Marc Ressler, Lam Nguyen, Francois Koenig, David Wong, and Gregory Smith, entitled "The Army Research Laboratory (ARL) Synchronous Impulse Reconstruction (SIRE) Forward-Looking Radar," Proceedings of SPIE, Unmanned Systems Technology IX, Vol. 6561, May 2007, which is hereby incorporated herein by reference. It is to be appreciated that the radar can be configured in both forward-looking and side-looking SAR modes.

Conventional side-looking SAR systems are designed such that the radar is typically mounted on an airborne vehicle (e.g., aircraft) whereby the transmitting and receiving antennas typically face the direction perpendicular to the flight path. Through signal processing, the reflected radar signals along the flight path are combined to form the SAR image for the area that exists along only one side of the reflected image.

FIG. 4 shows an illustration of a conventional side-looking SAR system used to survey a long strip of an area of interest 410. The challenge here is the detection of directional targets 1,2,3,4, which only have high reflectivity in a particular direction. Arrows extend from each directional target 1,2,3,4 representing the direction of high reflectivity or the target's individual radar cross section. Typically, the reflected signals from targets 1, 2, 3, 4 backscatter in directions that the radar will not be able to receive. In particular, an airborne vehicle 420, as shown in FIG. 4, passing over target 1 may only be able to recognize the target if it receives the return radar signals in the direction of the arrows extending therefrom. Similarly, the same is true for targets 2, 3, and 4. Consequently, in order to receive or detect the reflected signals being radiated from the targets 1,2,3,4, the airborne vehicle with radar platform must fly in a direction perpendicular to the area of interest 410, or alternatively, fly in a circular path around the area of interest 410 in order to capture all of the signals reflected from the targets. Thus, the overall operation is very impractical as it takes a long time to traverse all the pertinent paths to obtain target information regarding area of interest 410. This requirement significantly slows down the total SAR operation and further makes a surveillance task using these conventional systems impractical.

Additionally, FIG. 5 shows an illustration of a conventional forward-looking SAR system mounted to an airborne vehicle 520 used to survey a long strip of an area of interest 510. The radar might be able to receive return signals from some small sections of targets 1 and 3 along the flight path, but may not capture the return signals from targets 2 and 4.

As such, an ultra-wideband radar system is needed that can radiate and receive energy in all directions, thereby employing an array of antennas having the capability to capture the return radar signals in all directions.

SUMMARY

In view of the foregoing, an embodiment herein provides a system for investigating an area of interest to display a SAR image in a single pass including: a radar platform mounted on a mobile vehicle, a radar antenna array including a first group of antenna elements including at least one transmitting element and a plurality of receiving elements and a second group of antenna elements including at least one transmitting element and a plurality of receiving elements wherein the first group may transmit a first group of signals and receive a first group of backscatter signals in a forward direction and the second group may transmit a second group of signals and receive a second group of backscatter signals in a backward direction; a first group of receiving modules to capture and digitize the return radar signals in a forward direction, and a second group of receiving modules to capture and digitize the return radar signals in a backward direction; a processor in communication with the radar receivers to process the first and second group of signals and produce a first and second image respectively; a GPS system to measure the radar position logged by the radar platform; an image combiner (part of the processor) to combine the first and said second images; and a display to display the combined image from the first and second combined images.

The image may be either a 2-D or 3-D image. The system enables the detection of directional targets (see, e.g., FIGS. 4-6) in a single pass.

Each of the transmitting elements may include a transmitter and a transmitting antenna and each of the receiving elements may include a receiver and a receiving antenna.

The number of the receiving elements in the first group of antenna elements may be equal to half of the total number of the receiving elements and the number of receiving elements in the second group of antenna elements may be equal to half of a total number of the receiving elements.

Each of the receiving antenna elements may be positioned in an adjacent array and separated equidistant.

The receiving antenna elements form a circular array.

The cross-range resolution of the system may be provided by the receiving elements and the radar platform, and the motion of the vehicle.

Each of the receiving antennas may collect electromagnetic backscatter signals and feed the data to the respective receiver, whereby the respective receiver captures and digitizes the radar signals into digital signals.

The processor may perform data processing on the digital signals including removal of interference, motion compensation, filtering, and forming, and combining SAR imagery.

Another exemplary embodiment may include a method for investigating an area of interest including mounting a radar platform and a radar antenna array on a mobile (ground or airborne) vehicle; transmitting a first group of signals and receiving a first group of backscatter signals in a forward direction from the radar antenna array;
transmitting a second group of signals and receiving a second group of backscatter signals in a backward direction from the radar antenna array; processing the first and second group of signals to produce first and second images; measuring a radar position of the radar platform; combining the first and second image.

The method may further include collecting backscatter radar signals via said receiving antennas and feeding said data to the respective receiver, whereby the respective receiver converts the radar signals into digital signals.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1A:
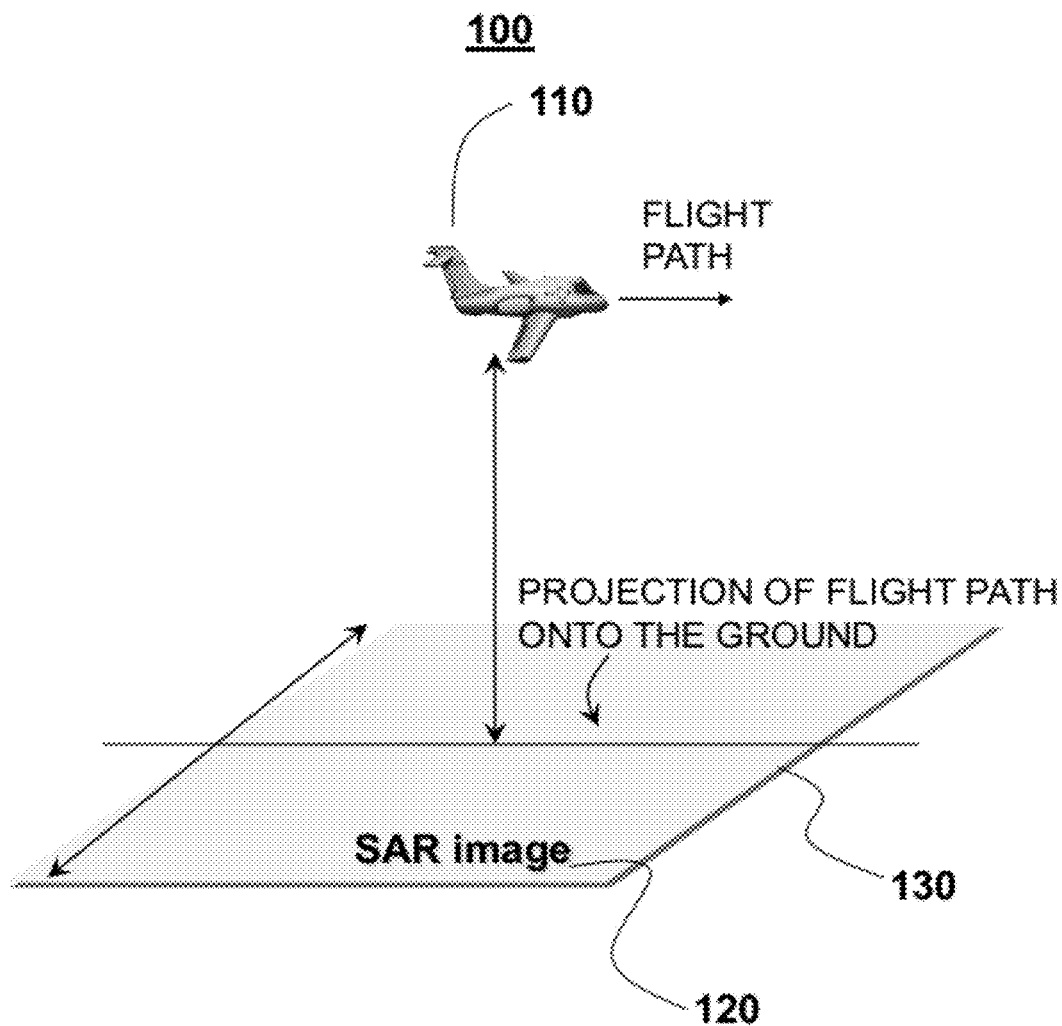
Figure 1B:
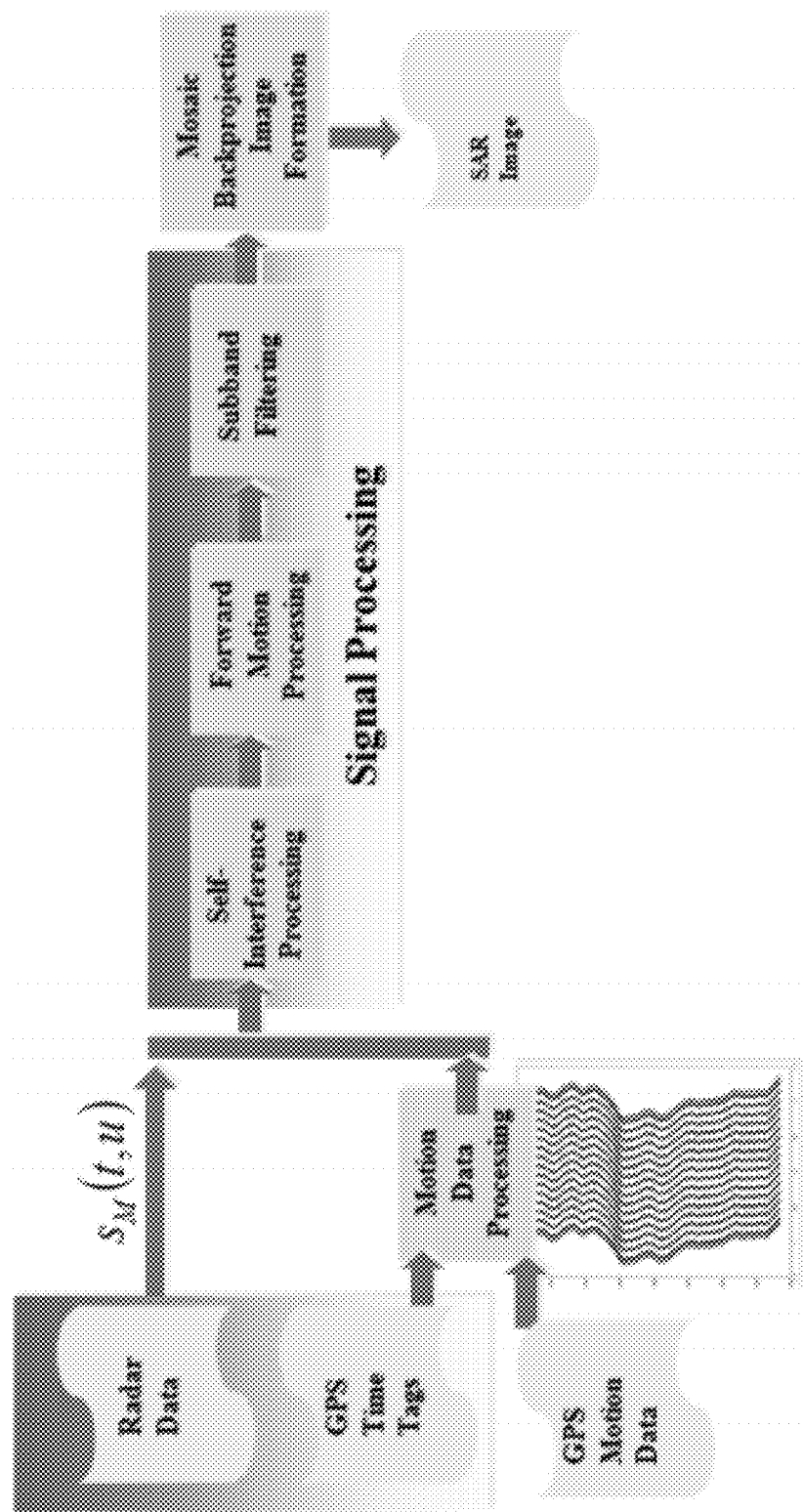
Figure 1C:
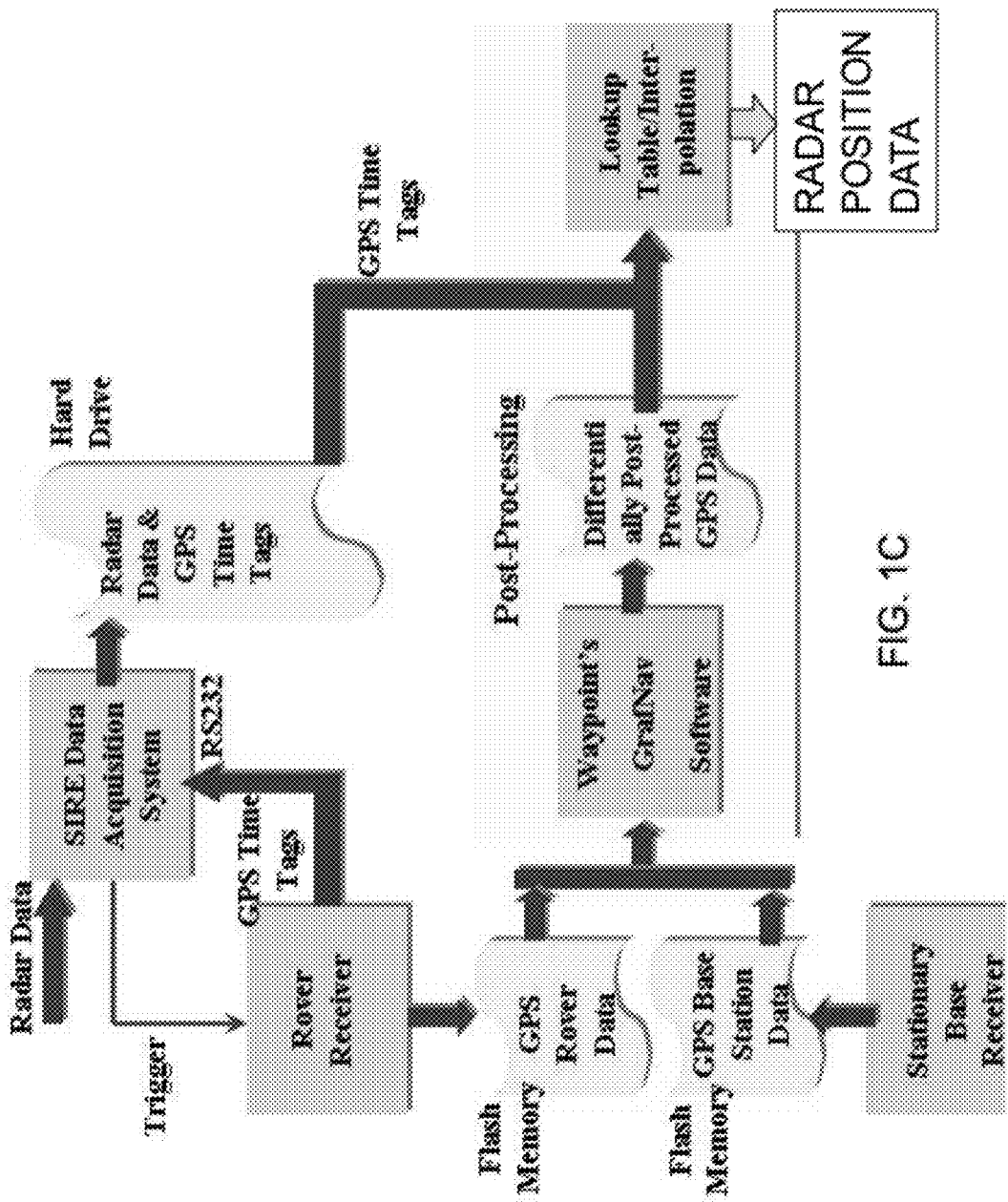
Figure 1D:
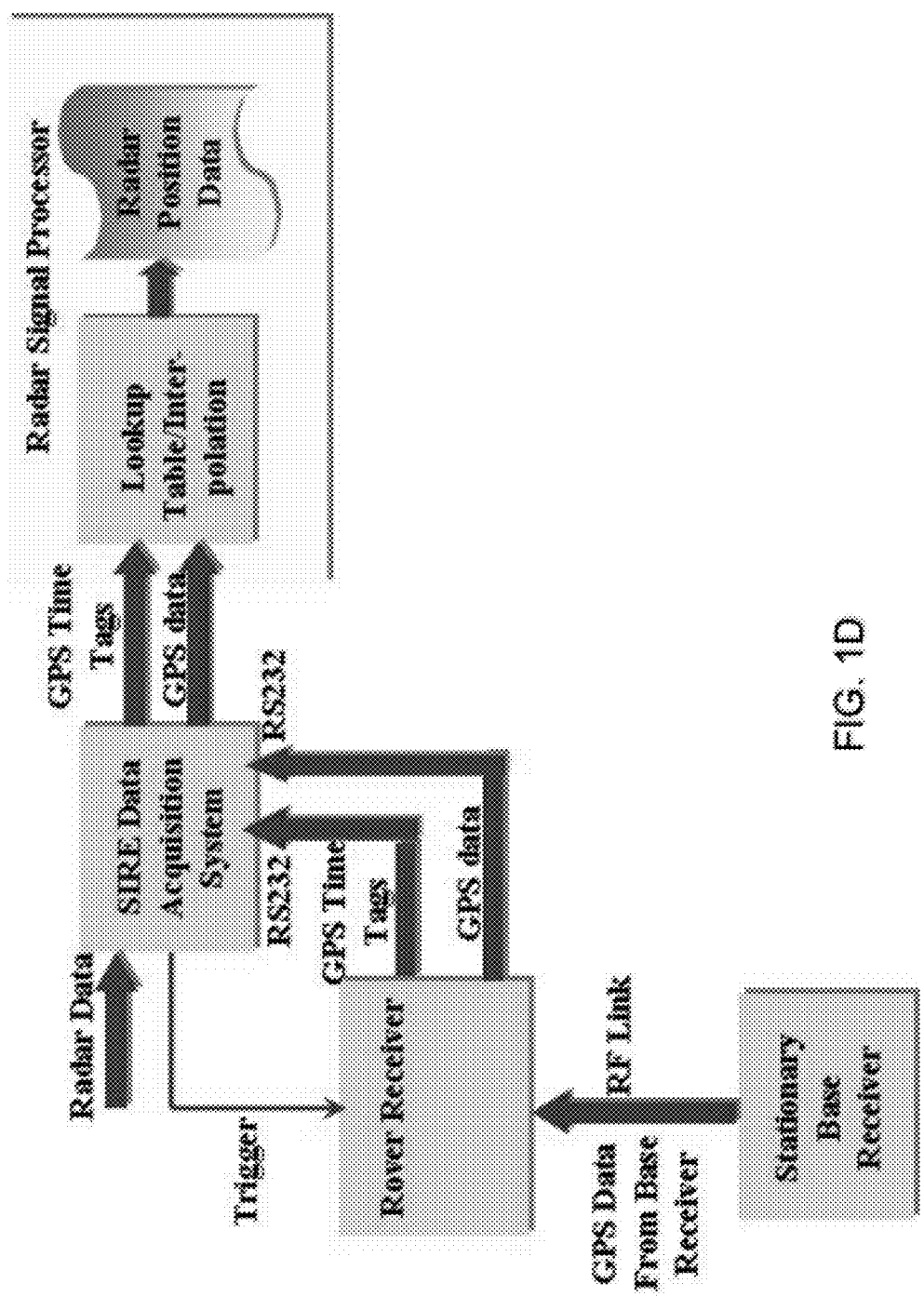
Figure 2:
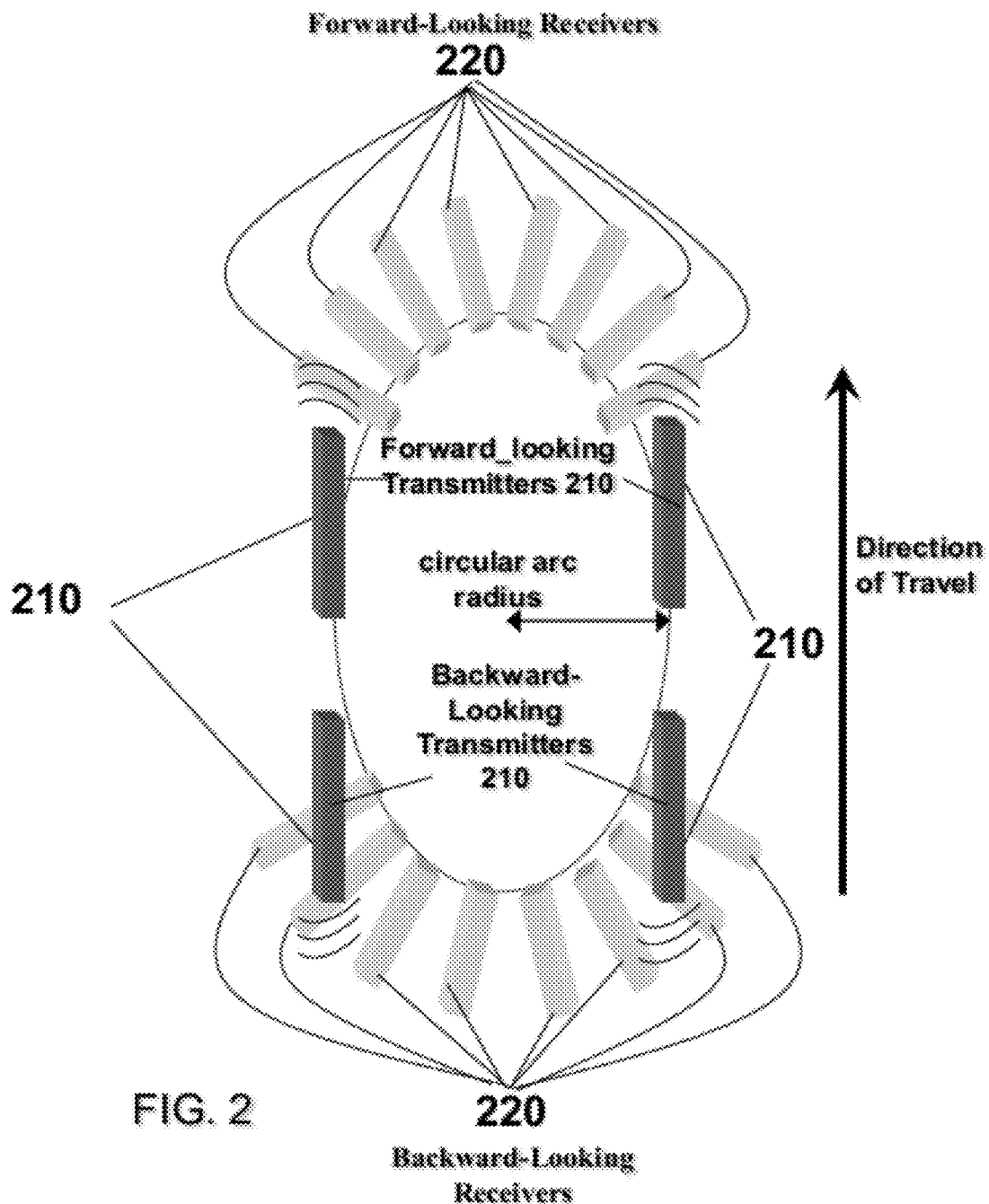
Figure 3:
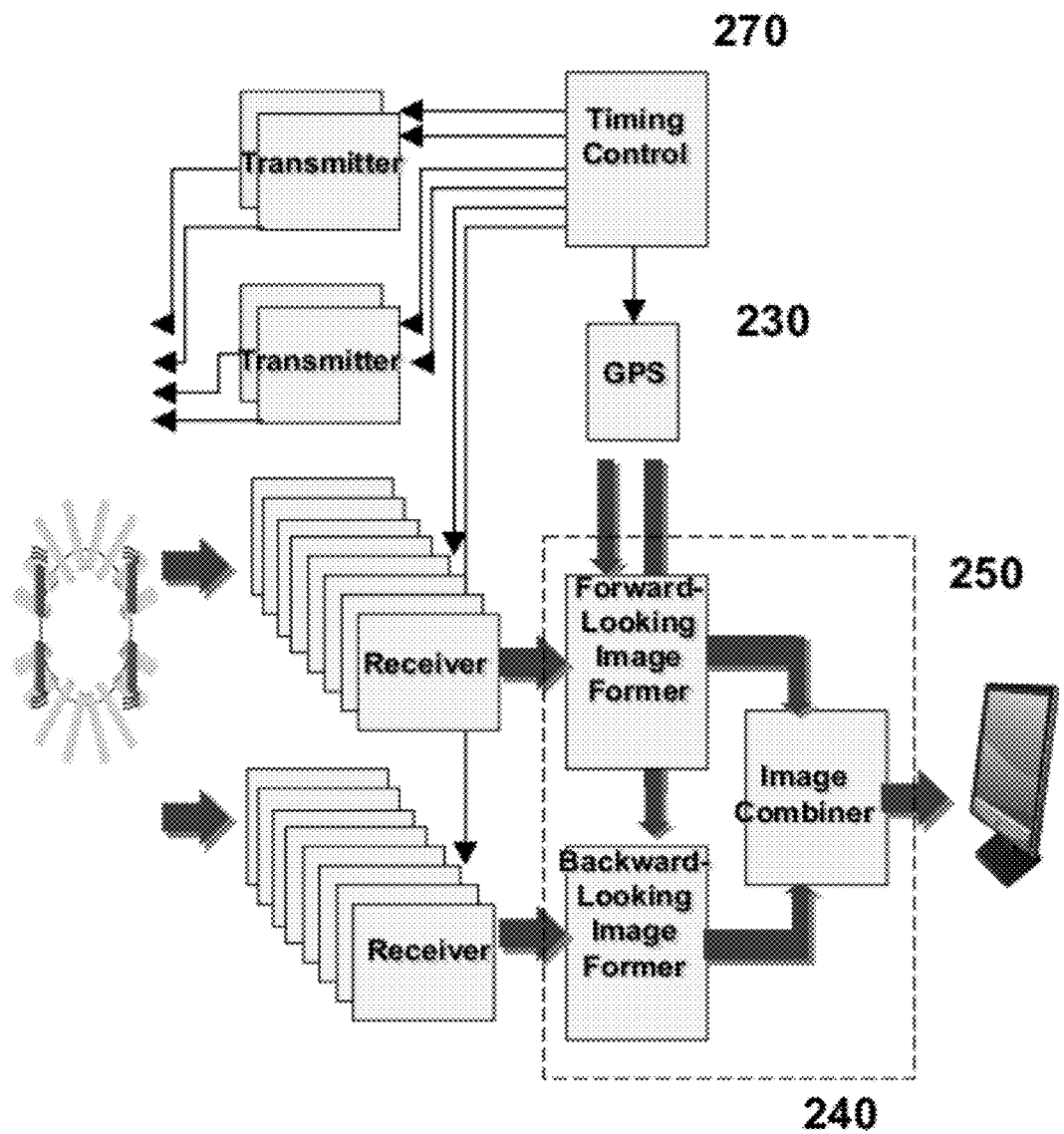
Figure 4:
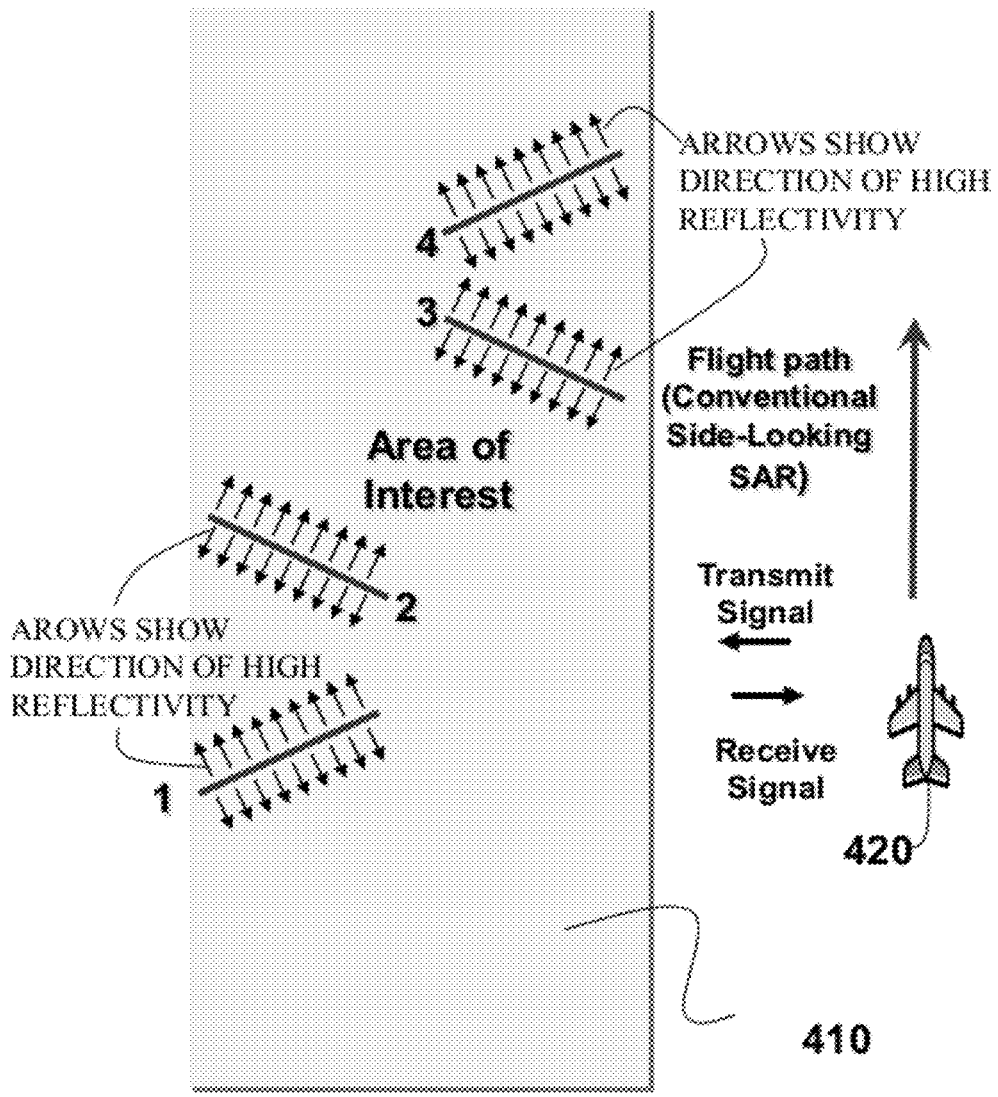
Figure 5:
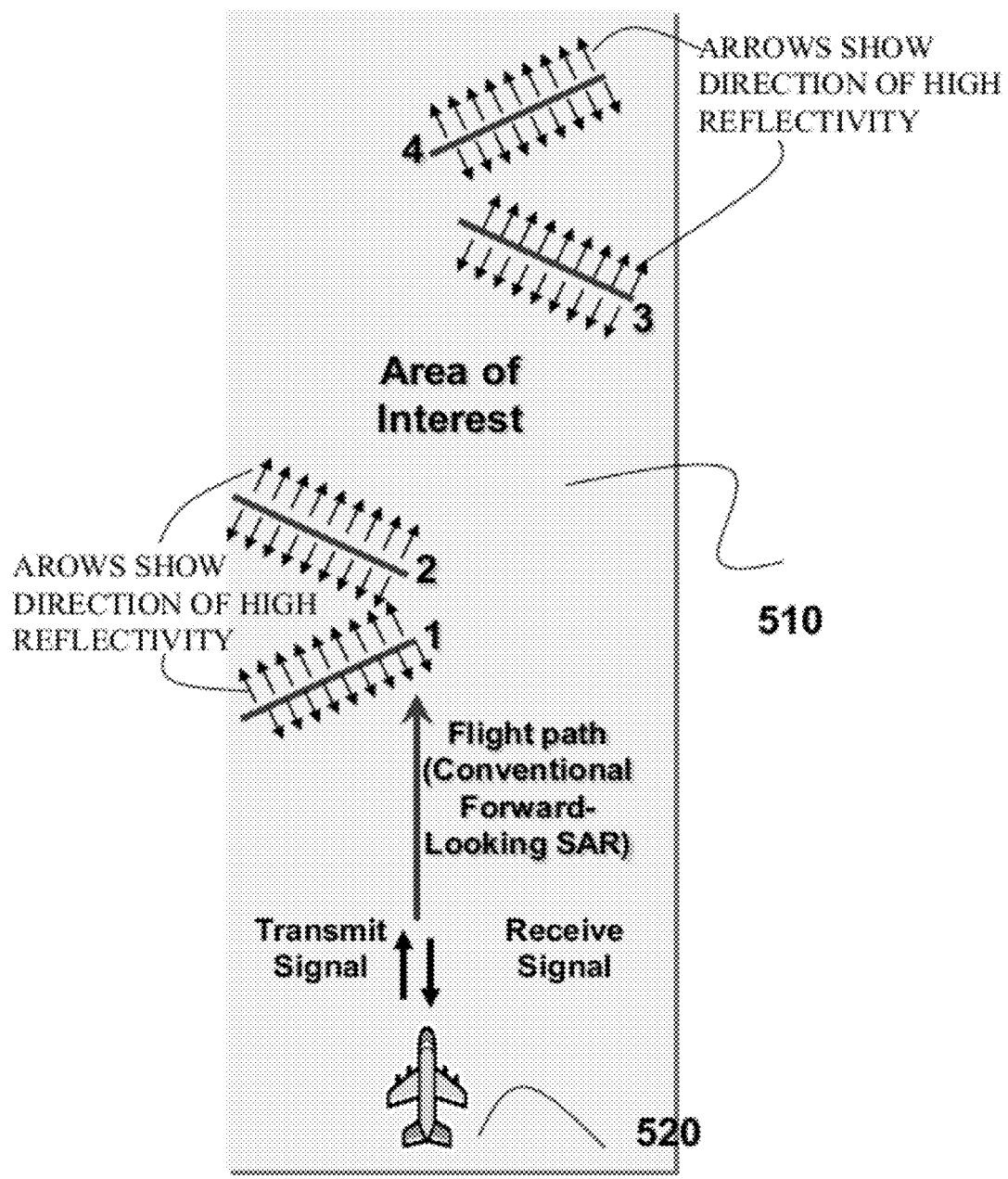
Figure 6:
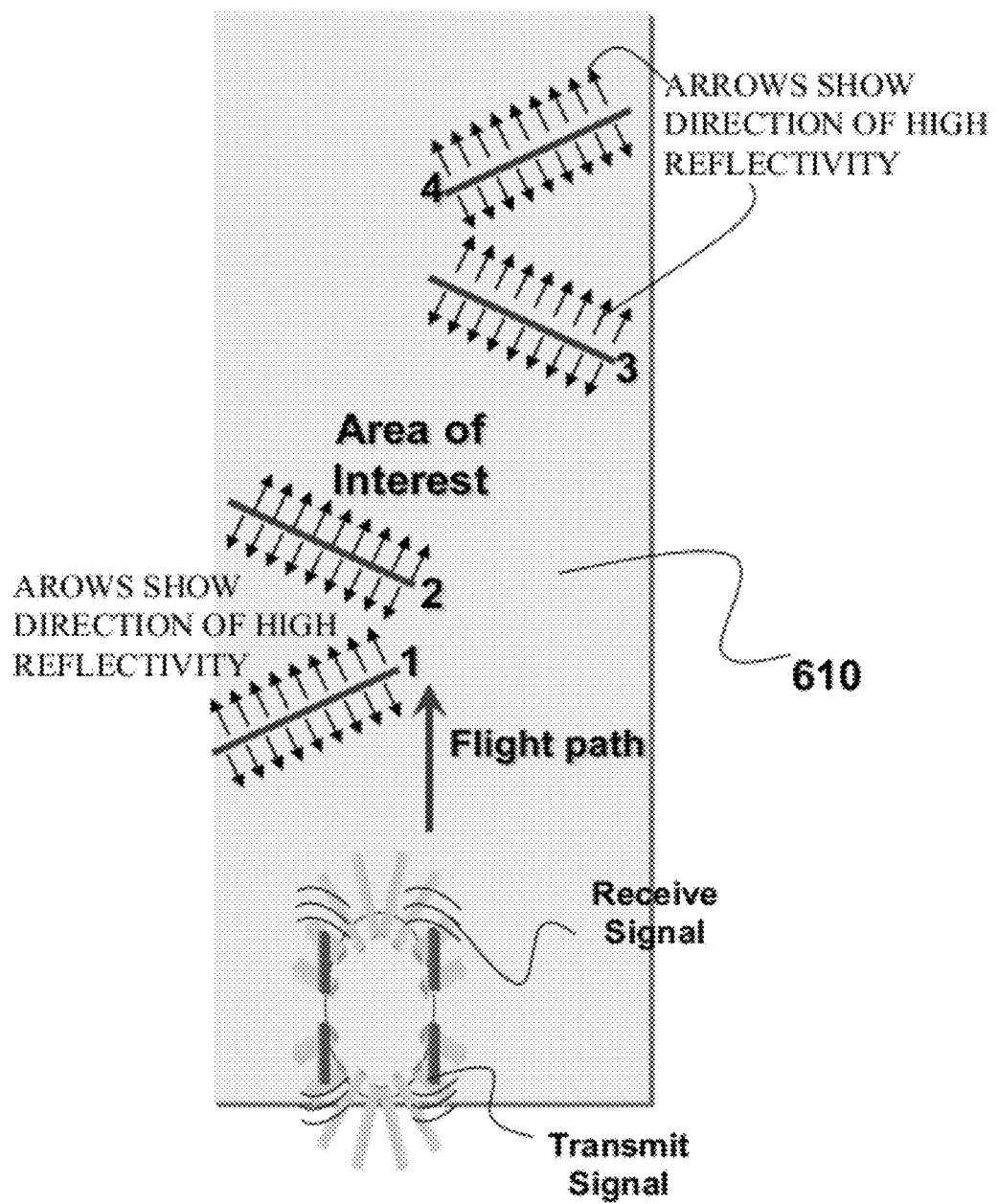
Figure 7:
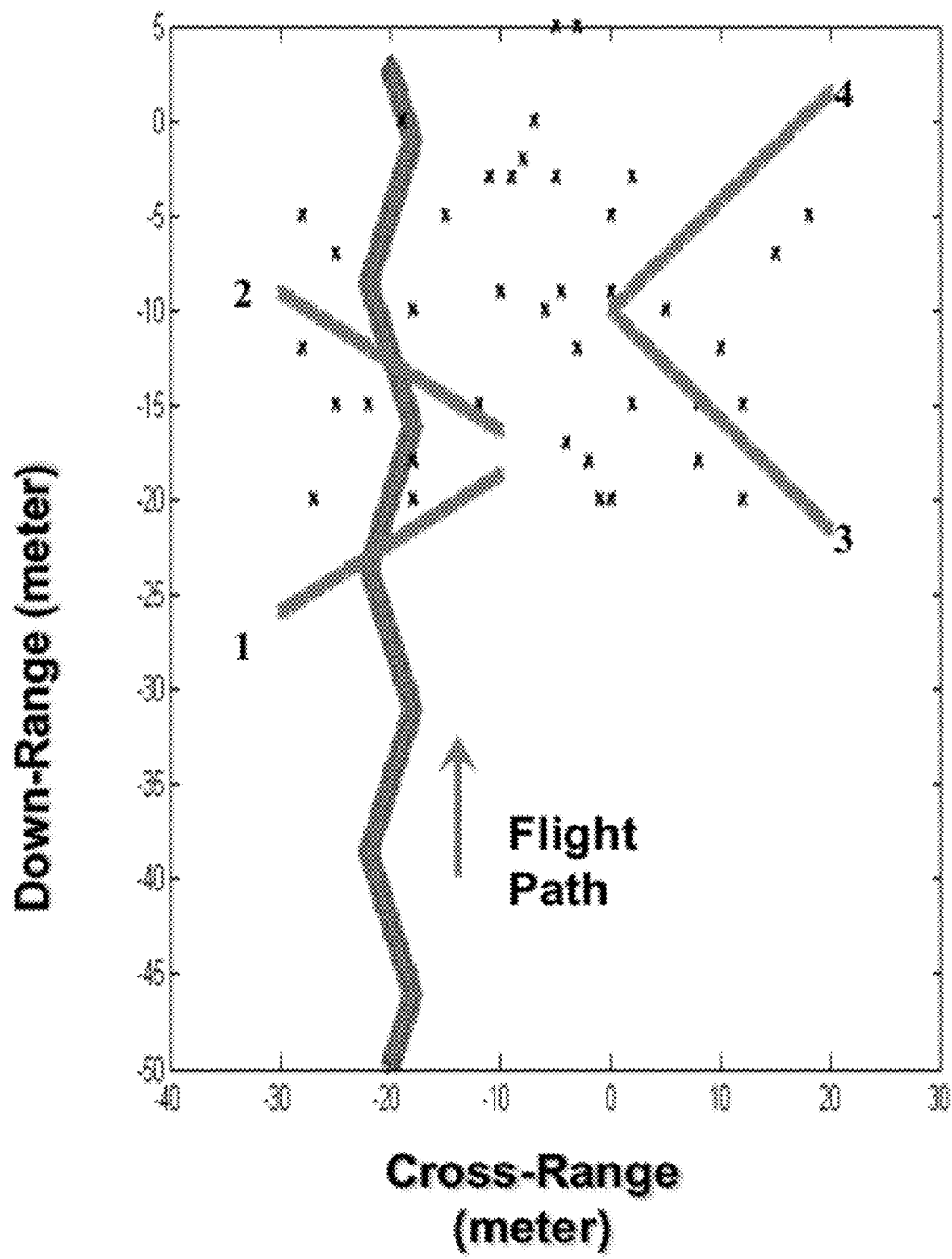
Figure 8:
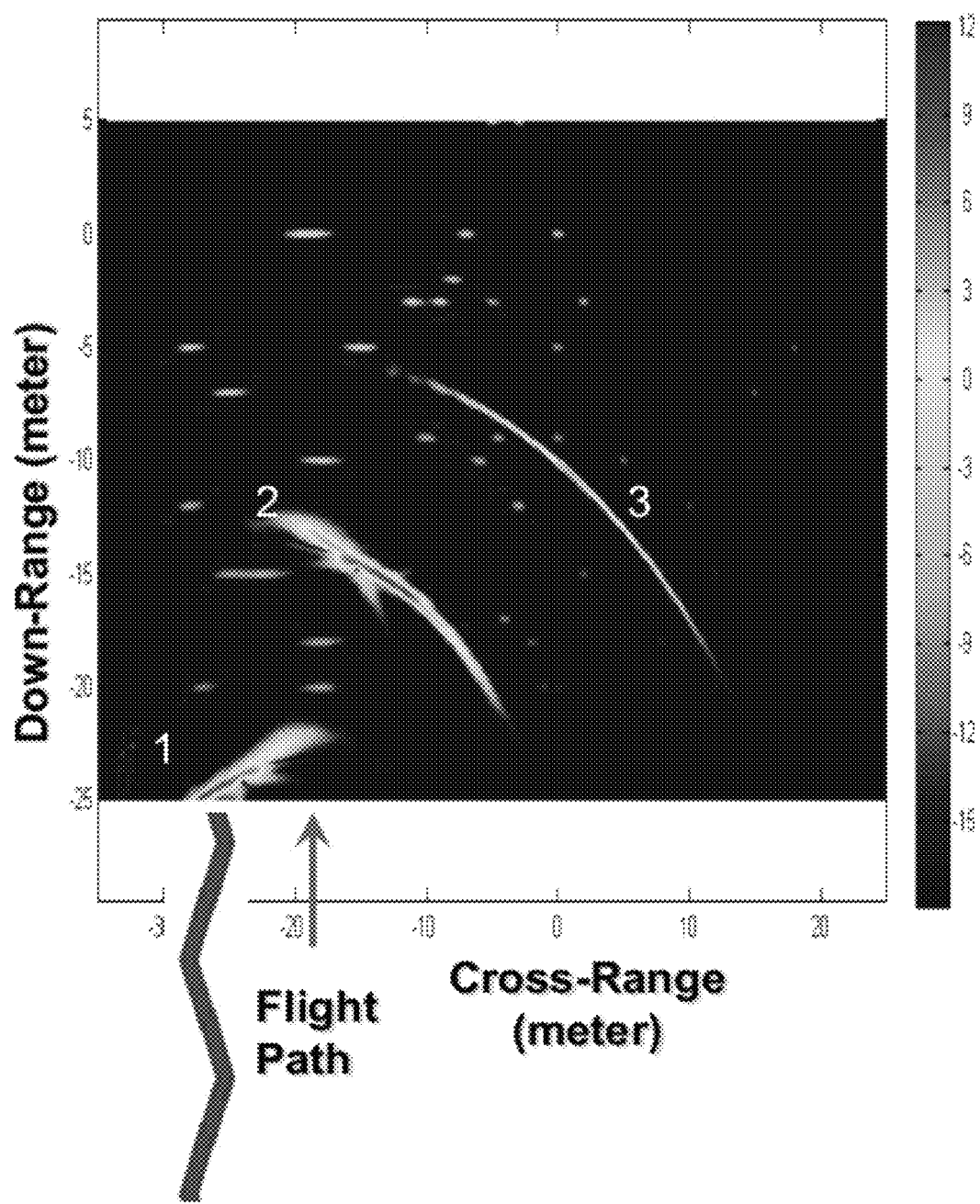
In FIGS. 8-10 the colors represent a decibel range which ranges from red to blue, red being the strongest signal and blue being the weakest.
Figure 9:
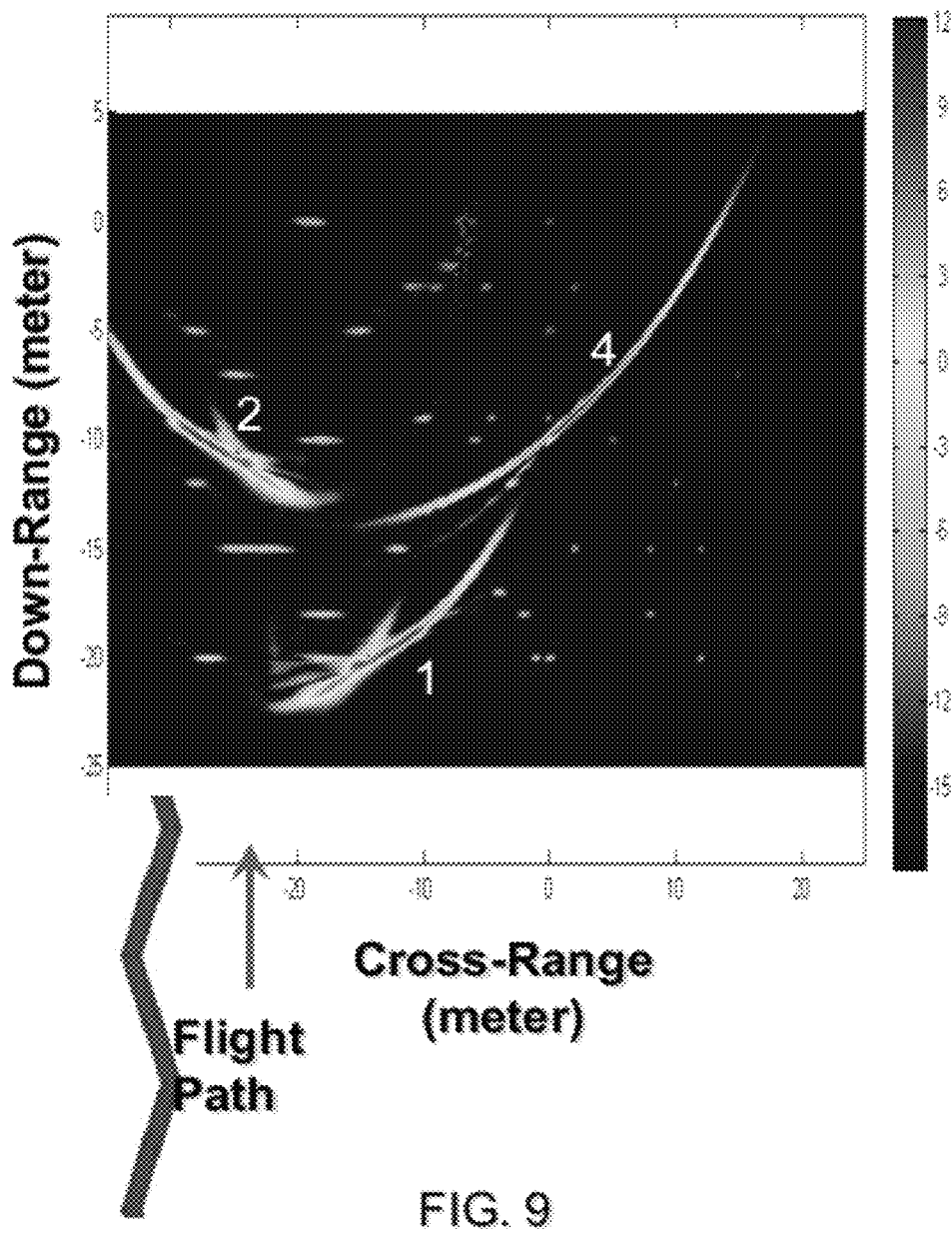
Figure 10:
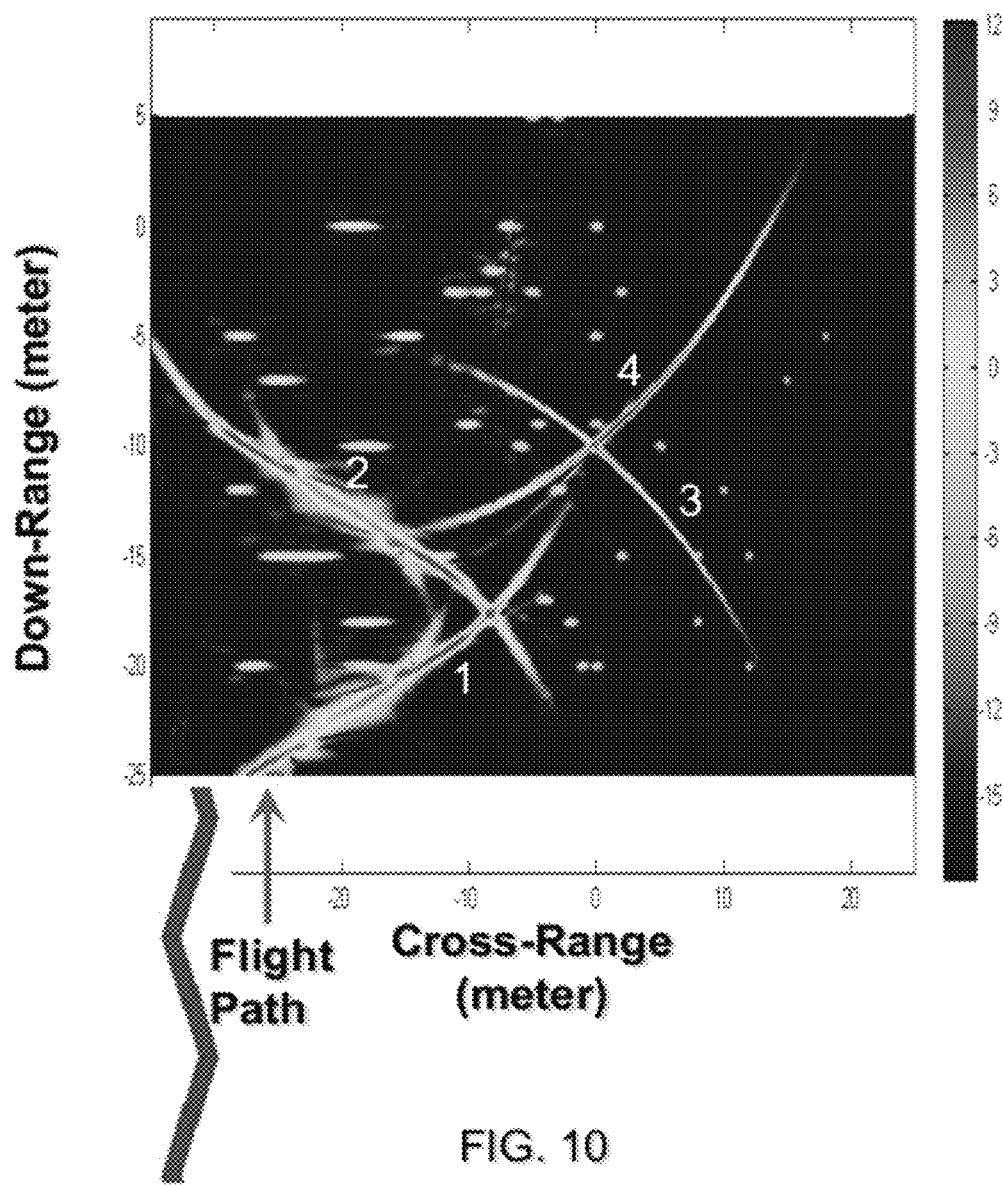

The embodiments herein will be better understood from the following detailed description with reference to the drawings, in which:

FIG. 1A is a diagrammatic illustration showing the flight path of an aircraft;

FIG. 1B is a block diagram of the overall processing steps for the ARL radar data in the forward-looking mode;

FIG. 1C is a block diagram of the processing of radar position data including GPS data in the post-processing mode;

FIG. 1D is a block diagram of the processing of radar position data including GPS data in the real-time processing mode;

FIG. 2 is a diagrammatic illustration of a configuration of antenna sub-systems of a SAR system;

FIG. 3 is a block diagram illustration of the SAR system of FIG. 2;

FIG. 4 is a diagrammatic illustration of a conventional side-looking SAR system used to survey a long strip of an area of interest;

FIG. 5 is a diagrammatic illustration of a conventional forward-looking SAR system used to survey a long strip of an area of interest;

FIG. 6 is a diagrammatic illustration of a survey of a SAR system;

FIG. 7 is a diagrammatic illustration of the simulation geometry of the SAR system of FIG. 6;

FIG. 8 illustrates an exemplary SAR image generated by the forward-looking subsystem of the SAR system of FIG. 6;

FIG. 9 illustrates an exemplary SAR image generated by the backward-looking subsystem of the SAR system of FIG. 6;

FIG. 10 illustrates an exemplary result of combining the SAR images of FIGS. 8 and 9.

DETAILED DESCRIPTION OF THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a SAR system capable of, among other things: area mapping, forming two-dimensional (2-D) and three-dimensional (3-D) imagery for the detection of targets under foliage, targets with high directional reflectivity, obstacles for robotic navigation, and mapping of internal building structures. In FIGS. 1 through 10 similar reference characters denote corresponding features consistently throughout the figures.

FIGS. 1A and 2 show diagrammatically data collection geometry with a SAR radar system 100. Generally, the radar system 100 includes an airborne or ground-based vehicle 110, a radar device (not shown), a transmitting/receiving antenna array 200, and a global positioning system (GPS) subsystem 230 (see FIG. 3). Both the radar device and the transmitting/receiving antenna array 200 are mounted on vehicle 110. The GPS sub-system 230 of the radar device records the radar position and the radar signals from the receiving antennas are measured. The measured radar signals from the receiving antennas and the radar positional information from the GPS 230 are used to form the SAR image 120, which covers a wide area 130 including the sides, front and back of the radar platform. The SAR images are continuously generated as long as the vehicle is in motion. Further, it should be noted that the exact height of the radar and the width of the SAR images can be changed by adjusting the radar's "stand-off" distance (i.e., the distance separating the radar system from the area of interest) and range swath (i.e., width of the imaged scene in the range dimension). Although an aircraft is shown in FIGS. 1A, 4 & 5, the radar system of the present invention is not limited solely to aerial vehicles. For example, the radar and the antenna element array 200 of the present invention can also be mounted on other moving vehicles, such as ground vehicles whereby the SAR image will be generated while the vehicle moves in a forward direction.

FIG. 2 shows the transmitting/receiving antenna array 200 configuration of the SAR system 100 of FIG. 1A, according to an embodiment herein. In particular, the transmitting/receiving antenna array 200 includes a plurality of transmitting elements 210 and a plurality of receiving elements 220 that may be positioned in a circular array such that the individual elements are equidistant. For merely purposes of explanation, four transmitting elements 210 and sixteen receiving elements 220 may be used. It is to be appreciated, however, the present invention is not limited thereto and as such, the number of transmitting and receiving elements may be chosen to satisfy the physical space constraints of the platform and/or the particular application involved. Turning to FIG. 2, receiving elements 220 may be arranged in a circular pattern having an arc radius that is defined as the distance from midpoint of the array to an end point of the circular array. Preferably, both the transmitting elements 210 and the receiving elements 220 are divided into two groups or sub-systems, which will be described in further detail below, including forward or front-looking receivers and transmitters and backward or back-looking receivers and transmitters. The first group or sub-system may be separated into a first set of eight receiving elements 220 and two transmitting elements 210 and used to transmit radar pulses and receive backscatter signals in the forward direction. The second group or sub-system may be separated into a second set of eight receiving elements 220 and two transmitting elements 210 and used to transmit radar pulses and receive backscatter signals in the backward direction. It is to be noted that there are preferably at least two transmitters used in each group (forward and backward) in order to increase the cross-range resolution of the image for the pixels near the projection line of the flight path onto the image plane. However, any number of transmitters may be used without departing from the scope of the present invention.

FIG. 3 shows a block diagram of the SAR radar system of FIG. 2 according to an embodiment herein.

Angular resolution is determined by the size of the receiving antenna array, and the synthetic aperture generated by the motion of the vehicle. At a given range, the ability to resolve objects or targets in the cross-range direction is known as the cross-range resolution. Similarly, the ability to resolve objects or targets in the down-range direction is known as down-range resolution.

The down-range resolution of the SAR system according to the present invention is generally provided by the bandwidth of the transmitted pulse from transmitting elements 210, having a wide range of frequency. The cross-range resolution is provided by both the array of receiving elements 220 and the radar generated by the moving platform. Additionally, as discussed above, the radar antenna array 200 includes two symmetrical sub-systems: a first (or forward-looking) group of antenna elements and second (or backward-looking) group of antenna elements. As shown in FIG. 2, each group may include two transmitting elements (e.g., a transmitter and transmitting antenna) and eight receiving elements (e.g., a receiver and receiving antenna). Each receiving antenna feeds its own receiver, and functions essentially as a digitizing system. To that end, each receiving antenna feeds an analog signal or data to each receiver which in turn converts or processes the analog data or signal in digitized form. The digitized data generated from each receiver of each receiving element 220 is combined and sent to processor 240, which then performs data processing tasks on the digitized signal (e.g., removal of interference from the digitized backprojection signal, motion compensation, filtering, and forming SAR imagery) using known image processing techniques, as outlined in "Signal and Image Processing Algorithms for the Army Research Lab Ultra-Wideband Synchronous Impulse Reconstruction (UWB SIRE) Radar," Army Research Laboratory Technical Report ARL-TR-4784 (2009), by Lam Nguyen, which is incorporated herein by reference. FIG. 1B is a block diagram of the overall processing steps for the SIRE radar data in the forward-looking mode. FIG. 1C and FIG. 1D are the block diagrams of the processing of radar position data including GPS data for post GPS processing and real-time GPS processing modes, respectively. As described in further detail in ARL Technical Report ARL-TR-4784, the radar may employ two Ashtech Z-surveyor GPS units in the differential mode to track the radar location that is necessary for the image formation algorithm. The GPS measurement system consists of two subsystems: a rover station, whose antenna is located with the radar's antenna frame, and a base station at a fixed location in the field. GPS data are recorded by both the rover receiver and the base station receiver. Both units operate independently and continuously track as many as 12 channels of satellites in orbit. The ARL radar system supports the data collection in two modes: post-processing and real-time. In the post-processing mode (FIG. 1C), measurements from the rover receiver are recorded independently and the GPS data stream from each receiver is recorded in its own flash memory. To synchronize the GPS measurement with the radar operation, the SIRE data acquisition and control system sends a trigger pulse to the rover receiver at the midpoint of each data acquisition cycle. In response to the trigger signal, the rover receiver reports back to the data acquisition system with the GPS time tag via the RS232 interface. The data acquisition then embeds this GPS time tag information into the radar data stream for synchronization purpose. After the radar measurement operation is completed, data from the GPS rover and base station receivers are differentially processed using the Wavepoint's GrafNav software to generate the position data within an accuracy of a few centimeters. With the differentially processed GPS data available, the radar (x, y, z) coordinates can be computed that are synchronized with the radar data measurements by using the GPS time tags embedded in the radar data stream and performing the table lookup and interpolation of the GPS data. In real-time mode (FIG. 1D), both the rover and the base station receivers record the GPS data independently as in the post-processing mode; however, data from the base station are sent to the rover via a radio frequency (RF) link. The rover receiver then combines its measured data with the base station receiver data, and differentially processes them to generate accurate GPS position information in real time. The two data stream—GPS time tags and the differentially processed GPS data—are sent to the data acquisition and control system by the rover receiver via two RS-232 interfaces. As in the post-processing mode, the radar signal and image processor computes the radar (x, y, z) coordinates that are synchronized with the radar data measurements by using the GPS time tags and performing the table lookup and interpolation processes. The difference is that the table lookup and interpolation of the GPS data are performed in real time in this case. Once the radar position information is available, the coordinates of the two transmitters and the receivers must be derived as required by the imaging process. Note that the GPS coordinates that were measured and computed (FIGS. 1C and 1D) only represent the positions of one point on the vehicle, which is the GPS rover antenna. The rover antenna may be located at approximately the center of a radar receiver antenna array. Since the locations of the transmitter antennas and the receiver antennas have fixed offsets (in three dimensions) with respect to the rover antenna, in theory, it is possible to derive the coordinates of all transmit and receive antennas from the coordinates of the rover antenna. However, in practice, the motion of the vehicle usually does not follow a straight path. Three components of the velocity vector are required to estimate the coordinates of all individual antennas. Among these three components, the heading information from the velocity vector is most important since a small variation in the heading results in a large error. For example, a change of 5° in the heading corresponds to a shift of 1.75 m for the imaging pixels 20 m in front of the vehicle. The phase coherency between data frames will be degraded and the quality of the resulting SAR image will suffer. However, using the radar position data, the heading information of the platform can be estimated, and then use this information to estimate the coordinates for the transmit antennas and the receive antennas. A simple smoothing filter or a more sophisticated Kalman filter can be used to filter the position data and estimate the heading information.

Referring to FIG. 3, examples of processor 240 may include but are not limited to a computer, central processing unit (CPU), microprocessor, multiprocessor, main frame computer, personal computer, or laptop computer. After image processing, a SAR image is generated. The GPS subsystem 230 measures the radar position at each data acquisition cycle logged by the moving platform, which is vital for the generation of the SAR imagery. Timing control circuitry 270 is responsible for coordinating the transmit and receive sequence that the radar operates. The SAR images from the forward-looking sub-system and backward-looking sub-system that are formed by processor 240 are formed on the same imaging grid, and are combined into a 2-D or 3-D SAR image via image combiner (within processor 240) and is then sent to display 250. The terminology "forward looking image former," "backward image former," and/or "image combiner" are used in the general sense and may comprise individual components, software components or subroutines, or a single component which performs all of the functions. The "forward looking image former," "backward image former," and/or "image combiner" may be performed by software on a single processor or computer or may be performed by multiple processors or computers.

FIG. 6 illustrates the SAR system of the present invention used to survey a long strip area of interest 610 according to an embodiment herein. Turning to FIG. 6, an airborne or ground-based vehicle passing over target 1, will be able to detect substantially all sections of the target utilizing both sub-systems (i.e., forward-looking and backward-looking sub-systems). In particular, due to the geometry of the antenna array configuration with respect to the target orientation, the section of the target to the left of the radar will reflect energy to the forward-looking sub-system array, and the section to the right of the radar will reflect the energy to the backward-looking sub-system array after the airborne vehicle with radar platform passes over the target. Similarly for target 2, the backscatter from the section of the target to the right of the radar may be received by the forward-looking array, and the backscatter from the section of the target to the left of the radar will be received by the backward-looking array. Reflected signals from the entire target 3 will be received by the forward-looking antenna array. Similarly, the reflected signals from the entire target 4 may be received by the backward-looking antenna array Thus, the preferred embodiment system is able, with a single pass, to receive reflected energy and backscatter signals from all the targets despite the locations or positional directions.

FIG. 7 is a diagrammatic illustration of the simulation geometry of the SAR system of FIG. 6. Shown are multiple isotropic targets (marked with X symbols) as well as highly directional targets 1-4. It is to be appreciated that none of the highly directional targets typically show up in the conventional SAR image. However, according to the SAR of the present invention, the radar will fly along the area of interest 610 and detect radar signals radiated from both the isotropic and directional targets.

FIGS. 8 and 9 illustrate the SAR images generated by the forward-looking sub-system and the backward-looking sub-system, respectively. Turning to FIG. 8, SAR imagery of the isotropic and directional targets shown in FIG. 7 are displayed. All of the isotropic targets are detected in the forward-looking images; yet, the forward-looking SAR sub-system does not detect the right section of target 1 nor the left sections of targets 2 and target 4. Similarly, as shown in FIG. 9, all of the isotropic targets are shown in the backward-looking images, yet, the backward-looking SAR sub-system does not detect the left section of target 1, the right section of target 2, and target 3. However, despite the slight limitations of the forward looking and backward looking sub-systems displayed in FIGS. 7 and 8 individually, it is to be noted that, the images are complementary. As such, combining the images of the forward-looking and backward-looking sub-systems will produce a complete or total representation of the radar images of the detected targets in the area of interest 610.

FIG. 10 shows the combined SAR images using an image combiner (from processor 240) from the images produced by both the forward-looking and backward-looking sub-systems shown in FIGS. 8-9. All of the highly directional targets are detected in the combined SAR image.

As used herein, the terminology relating to the emission or transmission of signals in opposing or opposite directions or substantially opposite is to be interpreted in the general sense in that the signals need not be transmitted in the exact opposite directions or that for each and every signal there is an exact opposite, but instead is intended to mean that the general direction of one set of signals is generally opposite to the other set of signals.

As will be appreciated by one skilled in the art, the embodiments described herein may be embodied as The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for investigating and displaying an image of an area of interest comprising:

a moving vehicle;

at least one processor for producing an image of the area of interest;

at least one first transmitter for emitting first radar signals substantially in a first direction towards the area of interest, the at least one first transmitter being operatively associated with the moving vehicle and the processor;

at least one first receiver for receiving first backscattered radar signals resulting from the first radar signals from the area of interest, the at least one first receiver being operatively associated with the moving vehicle and the processor;

at least one second transmitter for emitting second radar signals in a second direction, substantially opposite to the first direction, towards the area of interest, the at least one second transmitter being operatively associated with the moving vehicle and the processor;

at least one second receiver for receiving second backscattered radar signals resulting from the second radar signals from the area of interest, the at least one second receiver being operatively associated with the moving vehicle and the processor, a GPS subsystem for providing position data relating to the position of the vehicle;

the GPS subsystem, the at least one first receiver and the at least one second receiver operating to provide position and radar data to the at least one processor to form a combined image of the area of interest; the at least one processor operating to combine image data derived from the first backscattered radar signals with image data derived from the second backscattered radar signals to form a combined image of the area of interest containing sizes, shapes and relative locations of objects in the area of interest; and a display to display the combined image.

2. The system of claim 1, wherein the wherein the first direction is a forward direction, the second direction is a rearward direction, and wherein the first transmitter transmits first radar signals in a forward direction into the area of interest and the second transmitter thereafter transmits second radar signals in a rearward direction into the area of interest as the moving vehicle travels forward, and wherein the first and second backscattered radar signals in combination with position data from the GPS subsystem form a combined image of the area of interest as the vehicle is moving.

3. The system of claim 1 wherein at lost one first transmitter emits first radar signals in a direction substantially forward of the moving vehicle and the at least one second transmitter emits second radar signals in a direction substantially backwards of the moving vehicle; and wherein the at least one first receiver receives backscattered signals and the at least one second receiver receives backscattered signals; each of the at least one first transmitter and the at least one second transmitter feeding first and second signals, respectively, to the at least one first receiver and the at least one second receiver, respectively, and wherein the first and second signals are different from one another.

4. The system of claim 3 wherein the first transmitted signals are transmitted by a first transmitter and received by a first array of first receivers and second transmitted radar signals are transmitted by a second transmitter and received by a second array of second receivers such that the radar signals are transmitted by the first transmitter and received by the first array at different time intervals than the second transmitter transmits and the second array receives radar signals.

5. The system of claim 3 wherein the at least one transmitter emits first signals over an angle less than or equal to 180 degrees and wherein the at least one second transmitter emits second signals over an angle less than or equal to 180 degrees in the opposite direction.

6. The system of claim 1 wherein the system is an ultra-wide, impulse-based synthetic aperture radar system with down-range resolution provided by the transmission of the first and second pulses within a wide frequency range and wherein each of the at least one first and second receivers comprises an array of antennas and wherein cross range resolution is provided by both the array of antennas and the synthetic aperture generated by the moving vehicle.

7. The system of claim 1, wherein the each of the at least one first transmitter and the at least one second transmitter comprises at least one transmitting antenna and wherein each of the at least one first receiver and the at least one second receiver comprises an array of at least our receiving antennas.

8. The system of claim 7 wherein each of the at least one first receiver and the at least one second receiver comprises a first and second array of antennas, respectively, and wherein the first array of antennas receives signals over an angle less than or equal to 180 degrees and wherein the second array of antennas receives second signals over an angle less than or equal to 180 degrees in the opposite direction.

9. The system of claim 8, wherein each of the antennas within each of the first and second arrays are positioned equidistant from one another in a semicircular array pattern.

10. The system of claim 1, wherein each of the at least one first and second transmitters transmit pulses within a wide frequency hand and wherein a down-range resolution is provided by a total bandwidth of the transmitted pulses, and wherein a cross-range resolution of said system is provided by the at least one first and second receivers and the motion of the vehicle, and wherein the at least one processor performs data processing on the image data including removal of interference, motion compensation, and filtering.

11. A method for investigating an area of interest using a radar system comprising:
    mounting a radar antenna array on a vehicle moving in a forward direction;
    transmitting a first group of signals in a forward direction and receiving a corresponding first group of backscatter signals from the radar antenna array for forming forward image data of the area of interest;
    transmitting a second group of signals in a backward direction as the vehicle moves forward and receiving a second group of backscatter signals from said radar antenna array for forming rearward image data of the area of interest;
    measuring a radar position of said radar platform;
    processing the first group of backscattered signals to produce forward image data second group of signals to produce rearward image data;
    combining the forward and rearward image data to form a combined image; the combined image revealing the sizes, shapes, and relative locations of targets in the area of interest with respect to other objects in the area of interest; and
    displaying the combined image.

12. The method of claim 11 wherein the forward and rearward image data contain overlapping data relating to the area of interest and further comprising the step of receiving GPS position data relating to the position of the vehicle using a GPS subsystem and wherein the combined image is any of a 2-D and 3-D image and wherein the radar system is synthetic aperture radar system.

13. The method of claim 11, wherein the radar antenna array includes a first group of antenna elements including at least one transmitting element and a plurality of receiving elements and a second group of antenna elements including at least one transmitting element and a plurality of receiving elements.

14. The method of claim 13, wherein the vehicle is one of an aerial or ground vehicle and wherein each of the transmitting elements includes a transmitter and a transmitting antenna and each of the receiving elements includes a receiver and a receiving antenna.

15. The method of claim 14, wherein each of the receiving, elements are positioned in a circular array and separated equidistantly to receive signals from a wide range of directions.

16. The method of claim 11, wherein said processing said signals further includes:
  performing data processing on said digital signals for the removal of interference, motion compensation, filtering, and forming SAR imagery.

17. A system for investigating and displaying an image of an area of interest comprising:
  a moving vehicle;
  at least one processor for producing an image of the area of interest;
  at least one first transmitter thr emitting first signals substantially in a first direction, the at least one first transmitter being operatively associated with the moving vehicle and the processor;
  at least one first receiver for receiving reflected signals resulting from the first radar signals striking objects in the area of interest, the at least one first receiver being operatively associated with the moving vehicle and the processor;
  at least one second transmitter operatively for emitting second signals in a direction substantially opposite to the first direction, the second transmitted signals being distinguishable from the first transmitted signals, the at least one second transmitter being operatively associated with the moving vehicle and the processor;
  at least one second receiver for receiving, reflected signals resulting from the second transmitted signals striking objects in the area of interest, the at least one second receiver being operatively associated with the moving vehicle and the processor,
  a GPS subsystem for providing position data relating to the position of the vehicle;
  the at least one first receiver and the at least one second receiver operating to provide separate image data to the at least one processor; the at least one processor operating to combine image data from the at least one first receiver and the at least one second receiver with the position data to form a single image; and
  a display to display the combined image data revealing the sizes, shapes, and relative locations of targets in the area of interest;
  whereby the system is able to recognize objects in the area of interest when only one of the first or second transmitted signals reaches the object.

18. The system of claim 17 wherein the at least one first receiver and the at least one second receiver receive signals from opposite directions, and wherein the system is capable of capturing an image of the sizes and shapes of targets disposed at an angle relative to the flight path of an aircraft such that radar signals striking portions of the angularly disposed targets are deflected away from the at least first receiver; and radar signals striking portions of the angularly disposes are reflected towards the at least one second receiver, and whereby by combining the images of the at least one first receiver and the at least one second receiver a complete representation of the radar images of the detected targets in the area of interest is produced.

19. The system of claim 17 wherein at least one first transmitter emits first radar signals in a direction substantially forward of the moving vehicle and the at least one second transmitter emits second radar signals in a direction substantially backwards of the moving vehicle, and whereby the at least one first transmitter and the at least one first receiver comprise a forward looking sub-system and the at least one second transmitter and the at least one second receiver comprise a backward looking subsystem, and by combining the images resulting from the forward-looking and backward-looking sub-systems a complete representation of the radar images of the detected targets in the area of interest is produced.

20. The system of claim 17 wherein the at least one first receiver receives backscattered signals when the first radar signals strike a target in the area of interest and the at least one second receiver receives backscattered signals when the second radar signals strike the target as the vehicle moves past the target; each of the at least one first transmitter and the at least one second transmitter feeding first and second signals, respectively, to the at least one first receiver and the at least one second receiver, respectively.

* * * * *